June 12, 1962        H. G. MEAD        3,038,951

FAST ACTING TOTALLY EXPENDABLE IMMERSION THERMOCOUPLE

Filed Jan. 19, 1961        4 Sheets-Sheet 1

June 12, 1962 H. G. MEAD 3,038,951
FAST ACTING TOTALLY EXPENDABLE IMMERSION THERMOCOUPLE
Filed Jan. 19, 1961 4 Sheets-Sheet 2

United States Patent Office 3,038,951
Patented June 12, 1962

3,038,951
FAST ACTING TOTALLY EXPENDABLE
IMMERSION THERMOCOUPLE
Harold G. Mead, Tredyffrin Township, Chester County, Pa., assignor to Leeds and Northrup Company, Philadelphia, Pa., a corporation of Pennsylvania
Filed Jan. 19, 1961, Ser. No. 83,656
13 Claims. (Cl. 136—4)

This invention relates to thermocouple devices and more particularly to a simple, inexpensive thermocouple unit and has for an object the provision of a prefabricated and calibrated thermocouple unit which may be used but once in making a temperature measurement and then replaced by a similar unit for subsequent measurement to obtain each time an accurate measurement of temperature. The present application is a continuation-in-part of my application Serial No. 461,809, filed October 12, 1954, now abandoned, and my application Serial No. 736,947 filed May 14, 1958, issued September 5, 1961 as U.S. Letters Patent No. 2,999,121.

The present invention is specially adapted for use in the measurement of the temperature of molten materials, particularly steel, where the temperature thereof is in a range above 1000° F. and is detected by immersing the measuring or hot junction of a thermocouple device in the bath of molten material and allowing it to remain until the thermocouple reaches the temperature of the bath. In such use, due to the high temperatures and the nature of the molten material, thermocouples are subject to change of calibration through contamination and, unless frequently checked for accuracy, may give results that are seriously inaccurate.

In the steel making art, for example, the temperature of molten metal in an open hearth approaches 3000° F. In accordance with prior practice, thermocouple elements respectively of pure platinum and of an alloy of platinum with rhodium are commonly used to form the thermocouple. The measuring junction is protected by a fused silica tube which is renewed after each measurement to avoid the possibility of porosity or breakage through frequent immersion. A supply of the thermocouple materials is usually stored within the device and arranged so that additional lengths can be withdrawn and a new junction welded after cutting off the portion thought to be contaminated.

The prior practice leaves much to be desired in several respects. To be certain of accuracy, the calibration should be checked after each reading. This is inconvenient and is seldom, if ever, done. Moreover, replacement of the protecting sheath, and renewal of the hot junction of the thermocouple by cutting off lengths of the end portions of the elements and rewelding them are not operations readily carried out by furnace-operating personnel. When a sheath is removed under plant conditions there is always a chance that contaminating material will be deposited on the thermocouple and result in change in calibration upon heating. Still another difficulty with present immersion thermocouple devices is that there is no mechanical protection for the protecting sheath and both the sheath and thermocouple are frequently damaged during handling of the device.

The present invention eliminates the above problems by providing an expendable, low cost, prefabricated temperature sensitive device such as a thermocouple unit which may be easily and rapidly connected for use. After immersion in the bath of molten material and the taking of a temperature measurement, the unit may be discarded and replaced by another similar precalibrated thermocouple unit. In carrying out the concept of an expendable thermocouple, the thermocouple elements for the hot junction, which for measurement of molten steel may comprise platinum, and an alloy of platinum and rhodium, are made of extremely short length and very small cross section, i.e., a minimal amount of noble metal is used. Reduction to a minimum of the expensive material makes an expendable unit practicable and at the same time results in more rapid response in the assumption by it of the temperature of the molten material. The thermocouple elements are joined to suitable compensating lead-wire structure of base metal at a point close to the hot junction of the thermocouple. The base metal compensating leads extend to a reference junction, usually located at the measuring instrument.

More particularly, and further in accordance with the invention, the expendable thermocouple unit which is to be used in obtaining measurement of the temperature of molten metal comprises a supporting structure for the thermocouple elements. The supporting structure is of electrically non-conductive material having a low heat transfer characteristic. Corresponding ends of the thermocouple elements of short length and small cross section are joined together in spaced relation from a face of the supporting structure to form the measuring junction. The opposite or free ends of the thermocouple elements are connected within the supporting structure to compensating lead-wire structures of low cost material, the connections being in that part of the structure to be submerged in the molten material when the unit is immersed for temperature measurement. The thermocouple elements extending from one end or the face of the supporting structure are encased within a rigid sheath member which electrically insulates, supports and protects the elements. The lead-wire structure extends from the opposite end or another face of the supporting structure for ready connection to a temperature measurement system.

In order to preserve the compensating characteristics of the lead-wire structures during the course of measurement, the portions of the lead-wire structure adjacent the junctions are made of a size much greater than the cross-section of the thermocouple elements in order to conduct heat from the points of electrical connection with the compensating leads. This feature greatly aids in maintaining the accuracy of the thermocouple during temperature measurement.

A thin metal cap or cover which quickly melts away during immersion is applied to protect the hot-junction and the sheath in which it is enclosed against mechanical injury due to handling, and against floating slag on the molten metal.

In one aspect of the invention there is provided a device for immersion pyrometry comprising a cardboard tube and means including a condition responsive element supported by an immersion end of the tube. Electrically conductive members are connected to the condition responsive element and extend to the other end of the cardboard tube for connecting the element to a measuring circuit.

For other objects and advantages of the present invention reference may be had to the following description taken in conjunction with the accompanying drawings, in which.

Figure 1:
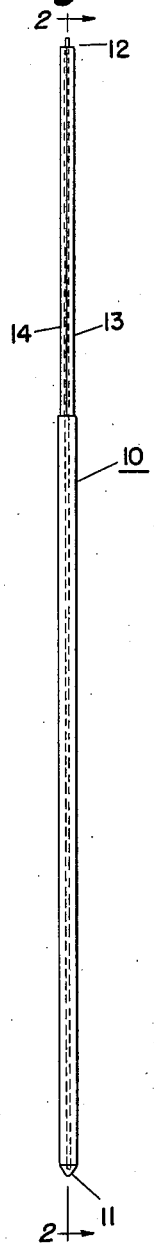
FIG. 1 is a side elevation of an instrument embodying the present invention.
Figure 2:
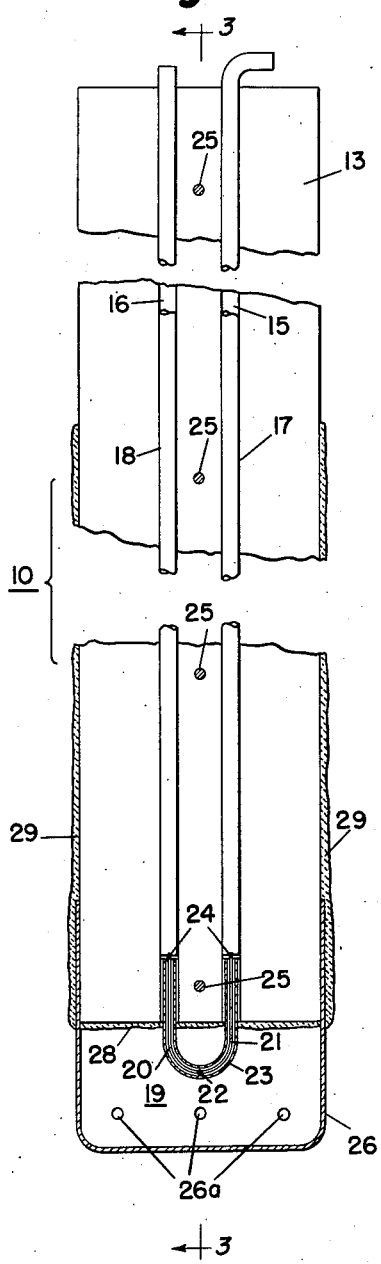
FIG. 2 is an enlarged sectional elevation taken on the line 2—2 of FIG. 1 illustrating constructional details of the present invention.
Figure 3:
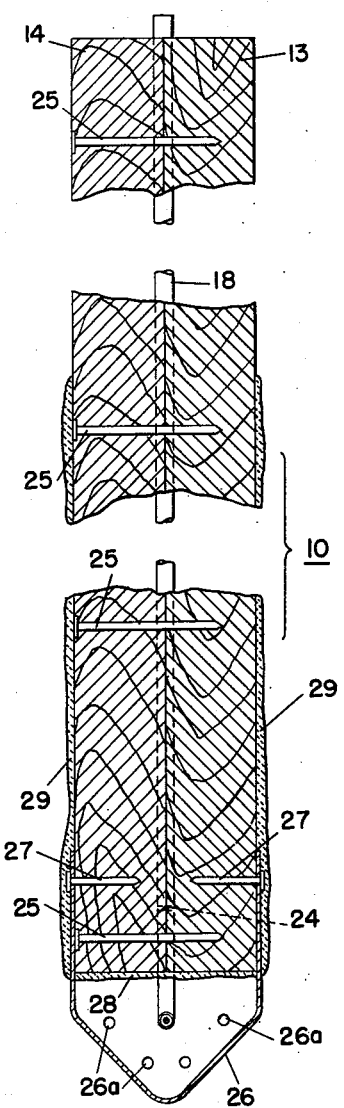
FIG. 3 is a cross section taken along a line substantially corresponding to line 3—3 of FIG. 2 illustrating other constructional features of the present invention.

Referring now to FIGS. 1–3, the invention has been shown in one form as applied to an assembly 10 approximately eight feet in length and which is intended to be totally expendable. The assembly 10 is of the spear type, the lower end 11 of which carries a thermocouple adapted to be immersed in a bath of molten metal whose temperature is to be measured. Lead wires or lead-wire structures extend from the thermocouple elements in the region of the lower end 11 to the upper end 12 of the assembly 10 and thence to conventional measuring apparatus generally including an exhibiting instrument for direct reading and recordation of the temperature of the molten metal.

Not only to minimize cost but also because satisfactory, the assembly 10 includes a body formed by two strips of wood 13 and 14 suitably secured together as by screws or by nails 25, as shown in FIG. 3. The strips 13 and 14 each have a pair of grooves 15 and 16 laterally spaced one from the other and extending the full length of the strips. When the two strips 13 and 14 are assembled in face-to-face relation, the grooves 15 and 16 are of adequate size to receive and to support the lead-wire structures 17 and 18 and the thermocouple assembly 19 now to be described.

The thermocouple assembly 19 includes thermocouple elements 20 and 21, both very short and both of fine gauge wire. One wire may be of platinum and the other an alloy of platinum including 10% of rhodium. The thermocouple element 20 extends outwardly from the groove 16, while the element 21 extends outwardly from the groove 15. The outwardly extending portions of the elements 20 and 21 are electrically connected together. They are preferably welded together to form the hot or measuring junction 22. The elements 20 and 21, including the measuring junction 22, are enclosed by and in contact with the inner walls of a close fitting thin-walled capillary sheath 23 formed of heat-refractory material, such as silica or quartz. The sheath itself extends inwardly of the grooves 15 and 16. Preferably, the ends of the sheath lying in the groove are cemented in place to provide a rigid and strong assembly of the sheath which itself forms a support for the thermocouple elements 20 and 21. The cement will preferably be of heat-refractory character, and it is generously applied as indicated at 28 across the lower end of the strips and in and about the sheath to form seals between the sheath and the grooves 15 and 16 in the strips 13 and 14 to prevent ingress of molten metal into the grooves. The refractory sheath not only forms a support for the elements 20 and 21, but serves the important function of electrically insulating thermocouple element 20 from thermocouple element 21 upon immersion of the assembly as a whole into a molten metal bath.

I have found with thermocouple assemblies, such as the assembly 19, which has just been described, there have been achieved temperature measurements within time intervals shorter by a wholly different order than heretofore. Thus in making measurements of high temperature molten baths such as of molten iron, steel and alloys, temperatures, as measured by thermocouple assemblies embodying the present invention, have been more accurate and usually higher by as much as 10° or more than temperatures measured by thermocouples available on the market prior to the present invention. Studies have indicated that the prior measurements were in error, due to insufficient time to attain an equilibrium temperature. When measuring molten bath temperatures using prior equipment, it is imperative that the temperature measurements be made in the minimum length of time to reduce the rate of destruction of the thermocouple elements.

The thermocouple assembly 19 achieves the higher order of speeded measurement as a result of a number of contributing factors. By utilizing capillary tubing 23 of refractory material as the sole means of electrically insulating the legs or elements of the thermocouple and selected on the basis of the temperatures to which it is to be exposed, which refractory material is transparent to heat radiation, there is not only avoided thermal lag due to the absence of other insulators and the resulting small mass and lower heat capacity of the resultant structure, but the tubing itself also provides for radiant transfer of heat directly to the thermoelectric junction in all directions. The capillary tubing 23 provides a relatively large area for its mass and provides relatively high rate of transfer of heat to the thermocouple elements 20 and 21 and to the junction 22. This is to be contrasted with refractory caps within which thermocouples have heretofore been disposed since, in accordance with the present invention, each leg of the tubular member 23 is completely surrounded by the molten bath, thus there is high heat transfer from every exposed portion of the tubing. There is avoided loss of heat away from the thermoelectric junction by conduction lengthwise of the thermocouple elements. The thermocouple elements 20 and 21 themselves may be reduced in cross section further to reduce the mass to be heated. Advantage may be taken of a reduction in the cross section area of the thermocouple elements since the capillary tubing provides, through its lengths, mechanical support therefor, electrical insulation of them and of the thermoelectric junction from the molten bath. The capillary tubing lends itself to evacuation or filling with inert gas to protect the thermocouple materials from chemical action. This construction also permits distortion of the tube as by heating and drawing or otherwise deforming the tube for more intimate physical contact between the inner walls of the tube and the thermocouple materials. The thermocouple elements extend outwardly of the opposite ends of the tubing and are connected into a measuring circuit.

In the preferred form of the invention, the tubing 23 is in the shape of a return bend with the end portions of the respective legs anchored into or supported by a refractory body of low heat conductivity. The refractory body may be of heat-resistant ceramic material or it may be of other inexpensive materials normally not considered refractory but which are resistant to the molten baths as, for example, wood or wood-like material which in use is charred to carbon but nevertheless resists destruction for a time adequate for temperature measurements of the molten steel or other materials. In addition to having the characteristic of low heat conductivity the body should have the physical ability of retaining mechanical rigidity for at least several seconds at the temperature to be measured. For steels this temperature may be as high as about 3500° F.

The ends of sheath 23 within grooves 15 and 16 terminate within the grooves within one inch or less from the refractory-coated surface 28, and the respective elements 20 and 21 project slightly beyond the ends of the sheath and are electrically connected to the lead-wire structures 17 and 18. As indicated at 24, the electrical connections may be made by welding. Satisfactory temperature measurements have been made with embodiments of the invention with thermocouple elements so short that the measuring junction 22 is but ¾" from the refractory face 28 and in which the elements extend into grooves 15 and 16 about the same amount. In the same embodiment of the invention, the grooves 15 and 16 were laterally spaced apart about one-half inch. Thus the thermocouple elements 20 and 21 are short, preferably not exceeding about two inches.

In order further to protect the thermocouple assembly 19, a metal cap 26 is shown with the strips 13 and 14 nesting therein and the thermocouple assembly 19 spaced from the closed end thereof. The metal cap 26 is rigidly secured to the strips 13 and 14 by any suitable means, such as nails 27. The cap not only prevents mechanical injury to the thermocouple assembly 19 during shipment and handling, but also protects the assembly from the slag floating on the top of the molten bath, such as steel. The cap 26 is preferably thin-walled so that it will rather quickly melt away after immersion into molten steel, but not until the assembly as a whole has been plunged past the layer of slag at the surface of the bath. Thus at the time the cap 26 melts away or is consumed, the thermocouple assembly 19 will have been moved to a selected subsurface level of the bath at which the temperature measurement is to be taken. Caps made of 28-gauge mild carbon steel sheets have been found satisfactory for molten steel. In measuring the temperature of molten steel in lower ranges while a bath is being heated it has been found that copper caps or aluminum caps are very useful. For measurements using the spoon test method, it will be found that the use of aluminum caps has the added advantage of providing the necessary aluminum for killing the chemical reactions. The rapidity with which the cap 26 is melted in the steel may be increased by providing in it a plurality of small perforations 26a which while permitting ingress of molten steel are too small to permit ingress of slag. Such holes or other openings to the interior of the cap also will permit the escape of gas when the assembly is immersed in the bath. The outer surfaces of the strips of wood forming the outer surface of the assembly as a whole may be coated with a refractory cement to minimize burning of the wood.

A refractory aluminum oxide cement available on the market under the name of "Alundum" will be satisfactory both for the outer coating and to form the seal between the refractory sheath 23 and the grooves 15 and 16.

The lead-wire structures 17 and 18 are selected to be of material such that they will provide compensating lead wires for the thermocouple, i.e., lead wires between the thermocouple and the measuring instrument which within a selected temperature range will not introduce extraneous E.M.F.'s into the measuring circuit. Those skilled in the art will understand that if the element 20 be of platinum and the element 21 of an alloy of platinum plus 10% rhodium, the lead wire 18 will comprise an alloy of nickel and copper (98% copper and 2% nickel), and the lead wire 17 will be made of copper. When thermocouples of other materials are utilized, the lead wires may be correspondingly changed to provide the desired compensation.

Further in accordance with the present invention, provisions are made so that the temperatures of the regions in which the electrical connections are made between the thermocouple elements 20 and 21 with their respective lead-wire structures 18 and 17 do not exceed 400° F.

The provisions which accomplish the foregoing objective are as follows. The thermocouple elements 20 and 21 are of the fine-wire type, by which I mean they have a size of the order of No. 30 B & S gauge, while the lead-wire structures 17 and 18 are of the order of No. 16 B & S gauge. In this modification the tube 23 had an internal diameter of about 1 millimeter and an outside diameter of about three millimeters. While the ratios of the cross-sectional areas between the thermocouple elements 20 and 21 and their respective lead-wire structures 18 and 17 are not critical, nevertheless, in this modification each lead-wire structure has a cross-sectional area several times greater than the cross-sectional area of the associated thermocouple elements. The lead-wire structures have the enlarged cross-sectional areas over a sufficient part of their lengths to establish a heat-absorbing capacity which is large compared with that of the thermocouple elements. Since the thermocouple elements are of fine wire and thus have small cross-sectional areas, there is only a low rate of heat flow along them to the regions 24 where they are connected to the lead wires 17 and 18. Thus by limiting the rate of flow of heat to a low order and by providing lead wires having relatively high heat storage capacity, the regions of connection 24 do not rise in temperature to any substantial degree, since the heat flowing thereto is conducted therefrom, or is absorbed, by the lead-wire structures. Thus the lead-wire structures may be considered as acting as a "heat sink" capable of taking the heat conducted by the thermocouple wires without an attendant rise of temperature approaching the undesirable upper limit of around 400° F. In FIGS. 2 and 3 the lead-wire structures are shown of uniform cross-sectional area, and such uniformity may frequenty be utilized where the cost of the lead-wire structures is of a relatively low order. As a substitute for using an enlarged cross-section of compensating lead wire to form a heat sink one may employ a good thermal connection such as a good heat conducting cement between the connections 24 and the material of the body.

While the heat storage capacity is an important consideration, it will be understood that capacity need not be extremely large since the period of time during which the temperature measurements are made is of generally short duration, of the order of a few seconds.

In addition to the foregoing, the strips of wood 13 and 14 have low heat-transfer characteristics, wood being a recognized heat-insulating material of low heat conductivtiy. Thus the strips of wood have adequate strength for the handling of the unit, provide material which makes easy fabrication of the unit, and which contribute their heat-insulating properties to satisfactory measurements of the temperature of molten steel.

In use, the thermocouple unit or arrangement 10 of FIGS. 1–3, after connection to a measuring or exhibiting apparatus is inserted into a furnace through a suitable opening in the furnace wall, and the end 11 is immersed in the molten metal. After the measurement of temperature, the unit of FIGS. 1–3 may be electrically disconnected from the exhibiting apparatus and dropped into the furnace to be consumed. Where the thermocouple elements 20, 21 are made of noble metal and it is desired to reclaim the elements as scrap, the unit may be withdrawn from the furnace for the purpose. In either event the thermocouple assembly is designed as an expendable unit, to be used only for a single measurement of temperature. Because of the need to use only short lengths of the noble metals and the general economy of construction, the expendable character of the unit may be achieved.

It has been found that a quarter-inch thickness of wood will retard the flow of heat sufficiently to permit a temperature measurement of satisfactory accuracy to be made. While the outer layer of the wood will char at sub-surface levels active combustion above the liquid level may be prevented if desired, by using a coating of refractory cement or the like.

While the strips 13 and 14 have been described as of wood, it is to be understood the invention is not limited thereto and that the terms wood and wood-like are to be taken in their generic sense to refer generally to woods of all kinds used for structural purposes and having adequate strength to be self-supporting and to handle a unit about eight feet long; and to include pressed wood and other materials having low orders of heat conductivity and the same ability to withstand high temperature over short periods of time.

Figure 4:
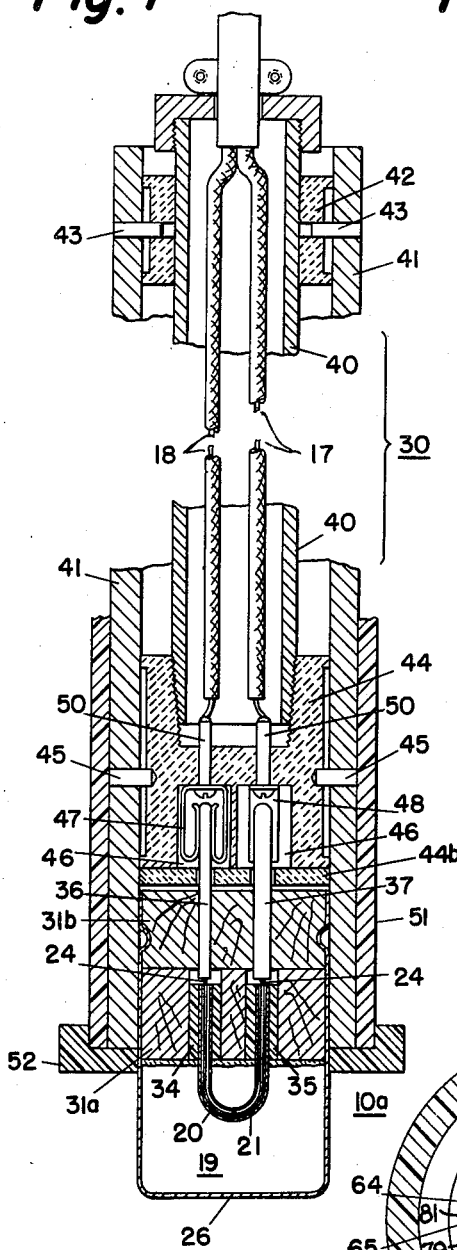
FIG. 4 is a cross-sectional view of another embodiment of the present invention disclosing means for effecting rapid mechanical and electrical connection of the thermocouple unit to a manipulating device.

In FIG. 4 there is disclosed an embodiment of the invention in which a thermocouple unit 10a of a "plug-in" type is adapted for quick mechanical and electrical connection to an end of a suitable manipulator structure 30.

The plug-in thermocouple unit 10a comprises the expendable portion of the assembly.

The thermocouple unit 10a includes body or supporting structure comprised of a lower block 31a and an upper block 31b formed of material having a low heat transfer characteristic. Blocks formed of wood such as hard maple have been found satisfactory. Alternatively, blocks 31a and 31b of the body may be formed of other suitable inexpensive material including hard paper with high resistance to heat flow and good mechanical or strength characteristics even after brief exposure to the high temperatures. Other materials which are satisfactory are ceramics and plastics which can be poured or molded and subsequently hardened and in which the ends of the quartz tube and the other internal elements of the unit 10a are supported. The lower block 31a is provided with a pair of spaced bores for accommodating the ends of the thermocouple assembly 19. The ends of the refractory sleeve 23, which encases the thermocouple, are firmly mounted within the bores by means including refractory cement or felt or paper sleeves 34, 35. The cement or sleeves 34, 35 serve to make assembly of the unit easy and help to prevent ingress of molten metal. The exposed face of the lower block 31a from which the measuring junction of the thermocouple 19 extends may be coated with a suitable refractory cement to further prevent ingress of molten metal. As indicated, cap 26 is a close fit over the supporting structure 31. It may be secured in place by indenting with a punch or like tool.

The upper block 31b accommodates a pair of pins 36, 37 force-fitted or embedded therein and formed of compensating lead-wire material. The pins 36 and 37 are welded or otherwise secured to the ends of thermocouple elements 20, 21 after which the blocks are placed together and secured by dowels or the like, not shown.

The pins 36 and 37 may be differently shaped and/or oriented to provide polarized electromechanical connections to suitable connecting means to assure connection to corresponding materials.

The prefabricated plug-in thermocouple unit 10a is adapted to be received in the open end of a manipulating rod or holding structure 30 which is approximately eight feet in length to facilitate the immersion of the thermocouple unit into a molten metal bath. The manipulating rod is shown comprised of two concentric steel pipes 40 and 41 mounted in spaced relation by a series of annular refractory rings or spacers 42, only one of the rings here being shown. It is to be understood that other rings are disposed in spaced relation along the length of the manipulating rod. If desired, the rings may be provided with undercuts to restrict the flow of heat from pipe 41 to pipe 40.

The rings 42 are rigidly secured to the outer pipe 41 by pins 43. The engagement between the rings 42 and the inner pipe 40 is in the nature of a slideable contact in order that relative expansion of the inner and outer pipes during immersion of the manipulating rod into the molten metal will not create stresses within the manipulating rod structure.

The lower end of the inner pipe 40 is threadably secured in a lower terminal block 44 which is fastened to the outer pipe 41 by pins 45 which block restricts the flow of heat from pipe 41 to pipe 40. The lower end of terminal block 44, which may be made of a dense refractory, is provided with a pair of counter-bored holes 46 having mounted therein spring-type contact members 47 and 48. As illustrated, the contact members provide a polarized arrangement due to a slight difference in diameter of holes in a masking plate 44b through which must pass the pins 36 and 37. The contact members are made of compensating lead-wire material, the material of contact member 47 being the same as that of the pin 36, while the material of the contact member 48 is the same as the material of the pin 37. With this arrangement, the continuity of the thermocouple circuit is maintained. The pins 50, rigidly securing the contact members 47 and 48 within their respective counter-bores, are also made of compensating lead-wire material, preferably welded to members 47 and 48, and serve to extend the thermocouple circuit to a position adjacent the end of the inner pipe 40 at which point compensating lead-wires 17 and 18 are connected to the pins, as by welding. Lead-wires 17 and 18 may be covered with ceramic or other suitable heat-resistant material. If desired, lead-wires 17 and 18 may be supported within the inner pipe 40 by a series of multi-holed porcelain or other refractory-type insulators.

The thermocouple unit 10a should have a very slight taper so that it fits like a cork or bottle stopper into the outer pipe 41. Such an arrangement provides for a close fit to prevent the seepage of molten material between the adjacent walls of the outer pipe 41 and the cover or cap 26 of the thermocouple unit. Deterioration of the outer pipe 41 can be retarded and the removal of slag encrustation made easier if heavy paper sleeves and/or a paper end-cap are employed. Such an arrangement is illustrated in FIG. 4 as comprised of the sleeve 51 and washer 52. The sleeve 51 and the washer 52, which are expendable, may be of paper about ¼" thick. The washer 52 may be either flat or cup-shaped.

From the foregoing it will be seen that the pins 36 and 37 are electrically connected to the thermocouple 19 and serve as coupling structure which cooperates with contact members 47 and 48 to provide quick releasable mechanical and electrical connection of the thermocouple unit 10a with a manipulator rod. Since the mechanical and electrical connection of the unit to the rod is accomplished without the need of tools, the unit 10a is referred to as a "plug-in" unit. It is a prefabricated unit and by reason of its low cost of construction it is expendable and may be disposed of after a temperature measurement has been made and then replaced by a similar prefabricated unit.

Figure 5:
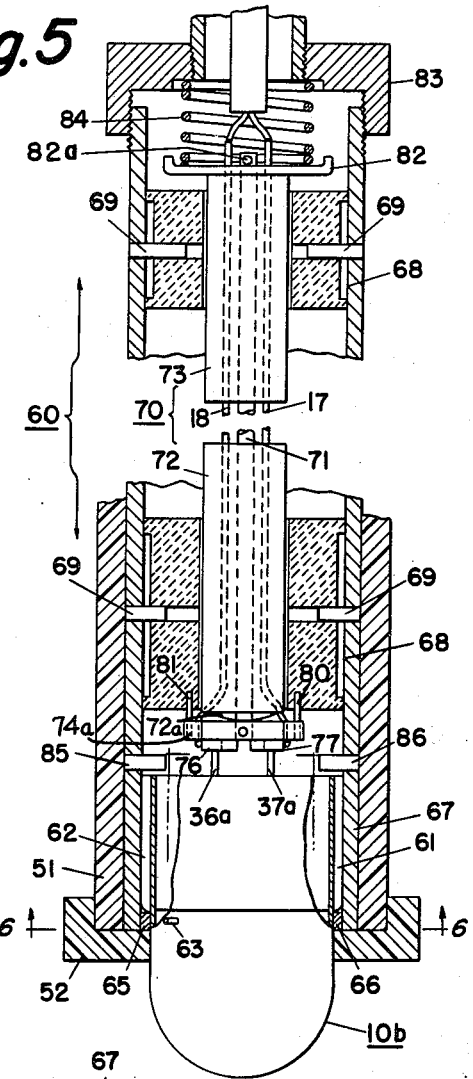
FIG. 5 is a cross-sectional view of yet another modification of the present invention.
Figure 6:
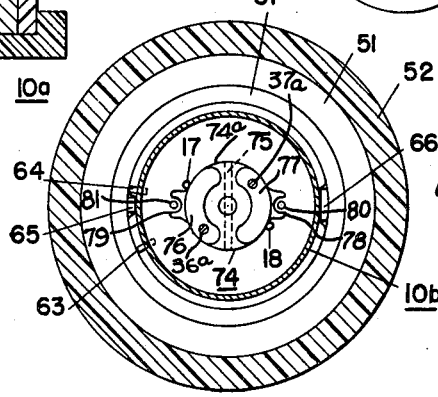
FIG. 6 is a cross-sectional view taken along a line substantially corresponding to line 6—6 of FIG. 5.

In FIGS. 5 and 6 there is illustrated yet another modification of the present invention in which an expendable prefabricated thermocouple unit 10b, similar in many respects to the expendable unit 10a of FIG. 4, is shown mounted within a manipulating or holding structure 60. The expendable thermocouple unit 10b differs from the unit 10a in that its sides include recessed or channeled portions 61, 62 and pins 63 and 64 (FIG. 6) which cooperate with pins or guide members 65 and 66 secured to the inner surface of the tube 67 to properly position and lock the thermocouple unit within the manipulating structure 60.

The manipulating structure 60 is comprised of the pipe 67, which may be steel or steel alloy, within which are mounted a plurality of spaced rings 68 formed of a refractory material similar to those of FIG. 4. The rings 68 are secured to the tube 67 by pins 69 and serve to support an assembly 70 which is comprised of a metal rod 71, preferably stainless steel, upon which are threaded a plurality of multi-holed refractory electrical insulating members 72 and 73. It will be understood that there are more than two of the insulating members present in the assembly, the others being omitted for purposes of clarity. Threaded through the holes of the members 72, 73 are a pair of thermocouple extension lead-wires 17 and 18, one being composed of commercially pure copper and the other being composed of an alloy of copper and nickel as previously described. 16 B & S gauge wire has been found satisfactory substantially to eliminate relative rotation of multi-holed insulators 72 and 73 about rod 71 and thereby prevent the possibility of short circuits in assembly 70.

The lowermost insulator 72 differs from the other insulators in assembly 70, as represented by the insulator 73, in that its lower end is provided with a convex surface 72a for the purpose to be hereinafter described. A contact assembly 74 including a plate 74a of insulating material such as dense refractory is attached to the end of rod 71 by a pin 75 and has its upper surface in contact with the convex portion 72a of the insulator 72. The contact assembly 74 includes a pair of contact segments 76 and 77 formed of compensating lead-wire material which are to be contacted by the lead-wire structure 36a and 37a extending from one end of the thermocouple unit 10b. The contact segments 76 and 77 are electrically connected to lead-wires 17 and 18 which emerge from the bottom portion of the insulator 72 through angularly displaced holes connecting with the through holes of the insulator. The connection between the lead-wires 17 and 18 and the respective contact segments 77 and 76, may be made by any known means, as by use of short lengths of stranded flexible lead-wire material welded or brazed thereto. The contact assembly 74 is provided with oppositely disposed recesses 78 and 79 which receive guide pins 80 and 81 to prevent rotation of the assembly 74.

The upper end of the assembly 70 includes a spring-receiving member 82 which is held on the rod 71 by pin 82a. The spring-receiving member 82 cooperates with a cap 83 threaded on the pipe or tube 67 and a spring 84 is provided to urge the assembly 70 downwardly. The extent of downward movement of the assembly 70 is limited by engagement of the spring-receiving member 82 with the spacer ring 68. The extent of force exerted against the assembly 70 by the spring 84 may be varied by adjusting the cap 83 along the threaded portion of the tube or pipe 67.

When the expendable thermocouple unit 10b is inserted in the lower end of the pipe 67, by aligning its recesses 61 and 62 respectively with the pins 66 and 65, the compensating lead-wire structures 36a and 37a engage their respective contact members, segments 76 and 77. The contact assembly 74 is adapted to rotate to a limited extent about the pin 75 and against the convex portion 72a of the insulator 72 in order to compensate for any possible differences in the lengths of structures 36a and 37a. Continued movement of the thermocouple unit into the end recess of the tube 67 and to a point where the lower end of the enlarged upper portion of the unit 10b is wholly beyond the pins 65 and 66, will cause the assembly 70 to move upwardly against the force of spring 84. The upper movement of unit 10b into pipe 67 is limited by stop pins 85 and 86. The stop pins 85 and 86 are optional inasmuch as assembly 74 will operate as a limiting means by engagement thereof with lower spacer ring 68.

The expendable element 10b is positively locked within holding structure 60 by partially rotating the unit so that the lower end of its enlarged upper portion rests upon the aligning pins 65 and 66. The extent of rotation of the unit is limited by engagement of one of the pins 63 with aligning pin 65. The thermocouple assembly is now ready for use except for applying a protective seal of quick-drying refractory cement around the joint between unit 10b and tube 67. If desired, a paper sleeve and cap similar to those mentioned in connection with the description of FIG. 4 may be employed.

After the taking of a temperature measurement of a molten bath of metal, the assembly or arrangement is withdrawn from the furnace and the expendable unit is removed from manipulating structure 60, by rotating the unit until the pin 64 engages the alignnig pin 65. At this time the recesses 61 and 62 of unit 10b will be in alignment with pins 66 and 65 and the unit may be readily withdrawn from pipe 67.

Figure 7:
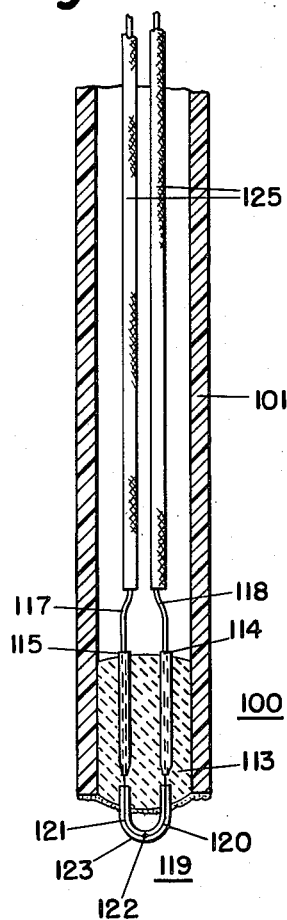
FIG. 7 is a cross-sectional fractional view of a modification of the invention showing the condition responsive element supported in the end of a cardboard tube.

Referring to FIG. 7, there is illustrated a further modification of an expendable immersion temperature measuring device 100. The device 100 includes a cardboard tube 101 of relatively thick wall construction so that the immersion end of it may be inserted below the surface of the molten material. It has been found that cardboard tubes having an inside diameter of 1½" and a wall thickness of about 5/16" will work satisfactorily. A tube of smaller diameter may be used and a tube of lesser thickness may be used depending upon the quality of the cardboard. The temperature sensitive assembly 119 is similar to thermocouple assembly 19 previously described. The thermocouple assembly 119 includes a pair of thermocouple elements 120 and 121, both very short and both of fine gage wire as previously described. Wires in the range of .010" to .006" diameter have been used and found satisfactory. One wire may be of platinum and the other an alloy of platinum including ten percent of rhodium. One end of each of the thermocouple elements 120 and 121 extends inwardly into a body member 113, while the other ends of thermocouple elements 120 and 121 extend outwardly and are electrically connected to form the hot or measuring junction 122. The thermocouple elements 120 and 121, including the measuring junction 122, are enclosed by and preferably in contact with the inner walls of a close-fitting thin-walled sheath 123 formed of electrically insulating, heat refractory material, such as high temperature glass, silica or quartz. The sheath 123 is preferably bent in the form of a U and the ends are embedded in the body member 113. The body member 113 has heat-insulating properties and may comprise a block made of "Narcoset" high temperature cement (manufactured by North American Refractories Company) which is comprised of high temperature clay with a sodium silica binder. Other equivalent cements or materials may be used. The cement is dried in a mold for about four hours at a temperature of about 300° F. Prior to placing the cement in the mold, the free ends of the thermocouple elements 120 and 121 are connected to lead wires 118 and 117 respectively. The lead wires 117 and 118 are compensating lead wires, as previously described, with lead wire 18 comprising an alloy of nickel and copper (98% copper and 2% nickel commonly referred to as No. 11 alloy) and the lead wire 117 is made of copper. When other condition-responsive units are utilized, the lead wires may be correspondingly changed to provide the desired compensation where necessary. The lead wires 118 and 117 are connected to the ends of the respective thermocouple elements 120 and 121 by means of copper sleeves 114 and 115. These sleeves 114 and 115 are crimped to bring the thermocouple elements 120 and 121 into direct contact with the respective lead wires 118 and 117.

The cement comprising the body member 113 is molded about the junctions between the thermocouple elements and the lead wires and dried until hardened. The body member or block 113 including the thermocouple assembly 119 is then pushed into the immersion end of the hard paper or cardboard tube 101 and sealed to the end of the tube by means of a refractory cement, such as the aforementioned "Narcoset" cement or "Alundum" cement or other equivalent. The compensating lead wires 117 and 118 are insulated from each other through the length of the cardboard tube 101 by means of insulators which have been illustrated in FIG. 7 as woven glass sleeves 125. When thick-walled cardboard tubes are used, they provide adequate heat insulation from the molten bath and thus relatively low temperature electrically insulating materials may be used to maintain the lead wires electrically separated. Likewise where the strength of the walls of the cardboard tube is adequate, additional reinforcing of the tube is not required. For immersion measurements the entire unit 100 may be expendable, for example as in the modification shown in FIGS. 1–3. In such applications the cardboard tube 101 may have a length as great as eight feet. Where temperature measurements are made in molten materials where slag does not present a serious problem, it has been found possible to make temperature measurements without using a protective cap.

Figure 8:
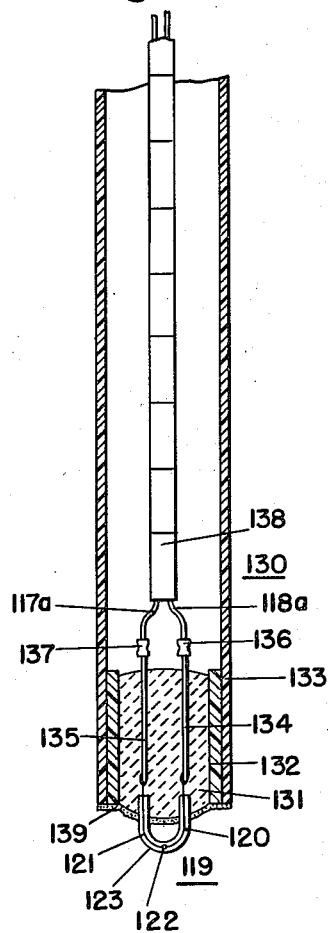
FIG. 8 is a cross-sectional fractional view of a modification of the invention similar to that shown in FIG. 7.

Referring to FIG. 8, there is shown another assembly found to be satisfactory. In this form, the temperature sensitive measuring device 130 comprises the thermocouple assembly 119 positioned in a body 131 which has been molded in a relatively short cardboard tube 132 and the latter inserted in the immersion end of a longer cardboard tube 133, the outer diameter of the tube 132 being substantially equal to the inner diameter of the tube 133 so that the tube 133 fits over tube 132 as shown in FIG. 8. The thermocouple assembly 119 is the same as that shown in FIG. 7 and includes thermocouple elements 120 and 121 joined at one end to form a measuring junction 122 covered by the sheath 123. In FIG. 8, the opposite ends of the thermocouple elements 120 and 121 are connected to relatively longer lengths of compensating lead wire material 134 and 135 as by silver soldering. The joints formed between the lead wires 134 and 135 and the respective ends of the thermocouple elements 120 and 121 are embedded in the molded cement body 131. The opposite ends of the lead wire members 134, 135 are in turn connected by way of connector members 136 and 137 to the compensating lead wires 118a and 117a. The lead wires 117a and 118a are adapted to be electrically insulated from each other by means of two-hole ceramic insulating members 138.

In use, the compensating lead wires 118a and 117a are pulled through the cardboard tube 133 to the immersion end thereof and connected by means of connectors 136 and 137 to the respective lead wire members 134 and 135 of the thermocouple unit. The thermocouple unit including the body 131 and the cardboard sleeve 132 is inserted into the end of the cardboard tube 133 and secured in place by a suitable refractory cement 139. In making a measurement the immersion end of the cardboard tube 133, along with the thermocouple unit, is inserted to a sub-surface level in the molten material. If desired, an eight foot length of tube 133 can be used to effect immersion or a non-expendable manipulator and a coupling device as illustrated in any of FIGS. 4–6 may be provided since the unit in tube 132 is separable from the lead wires 117a, 118a. After a measurement, using the arrangement as illustrated, the thermocouple unit may be removed from the end of the cardboard tube 133 and disconnected from the lead wires 118a and 117a. A new unit comprising thermocouple 119 and its body 131 and sleeve 132 may then be reconnected to the lead wires and a new paper tube 133 installed for a subsequent measurement. It will be understood that the blocks 31a and 31b of the plug-in arrangement disclosed in FIG. 4 may be separated and secured in the respective ends of a cardboard tube, such as tube 132 of FIG. 8, of any desired length.

Figure 9:
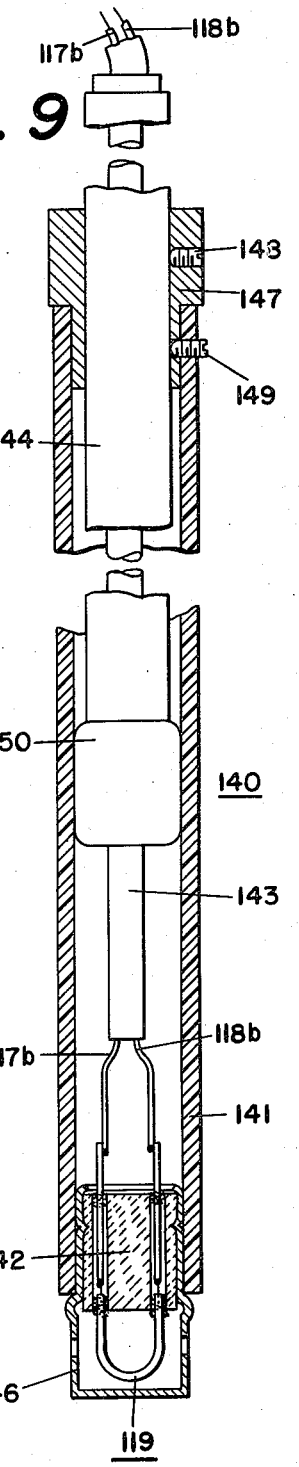
FIG. 9 is a cross-sectional view of a further modification of the invention.

In FIG. 9, there is illustrated another form of the invention where a cardboard tube about two to four feet long is used with a simple pipe type manipulator member. In FIG. 9, the assembly 140 includes an expendable section comprising a cardboard tube 141, the immersion end of which is provided with an expendable primary element. The primary element has been illustrated as a unit including the thermocouple assembly 119 like that described above, which is supported in a body or block 142 which may consist of a split wood plug or a molded cylindrical member of a heat refractory material, such as ceramic or molded wood or molded paper products. The thermocouple assembly 119 is connected to compensating lead wires 117b and 118b in a manner similar to that described in connection with FIG. 8. The compensating lead wires 118b and 117b are provided with suitable electrical insulation 143 and extend through a manipulator member 144 which may comprise one or more sections of one inch diameter black iron pipe, such as shown in FIG. 4. The compensating lead wires 118b and 117b at their other ends are adapted for connection to a suitable measuring instrument.

The body member 142 of the expendable primary element is adapted to carry a cover 146 which extends over the thermocouple assembly 119 in manner previously described in connection with FIGS. 1–5. The body member 142 and the cover 146 are adapted to be inserted into the immersion end of the cardboard tube 141 in the manner shown in FIG. 9. The cardboard tube 141 is adapted to slide over the end of the pipe 144 until it engages a shouldered collar member 147 which is secured to the pipe as by a set screw 148. The cardboard tube 141 is adapted to be secured to the shoulder of collar 147 by suitable means, such as a set screw 149, to hold the tube in place during an immersion measurement. The end of pipe 144 within the cardboard tube 141 may be provided with a pipe coupling or sleeve 150 to serve as a spacer for the cardboard tube 141. After a measurement is completed, the expendable primary element 142 is disconnected and the cardboard tube 141 is removed from the manipulator and a new element and tube installed.

Figure 10:
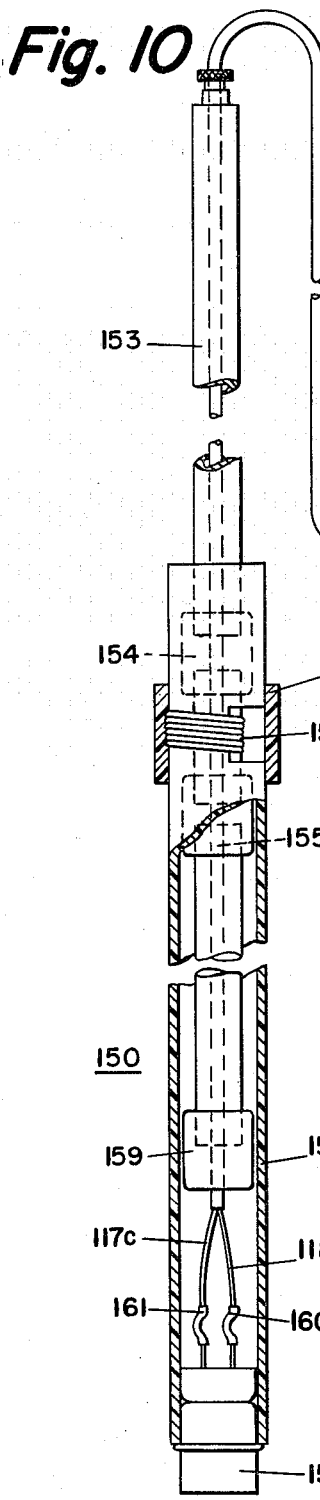
FIG. 10 is a cross-sectional view of still another modification of the invention.
Figure 10A:
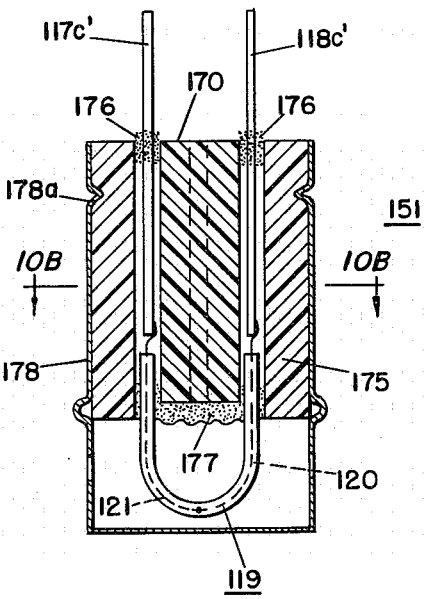
FIGS. 10A and 10B are cross-sectional views of the thermocouple unit shown in FIG. 10.
Figure 10B:
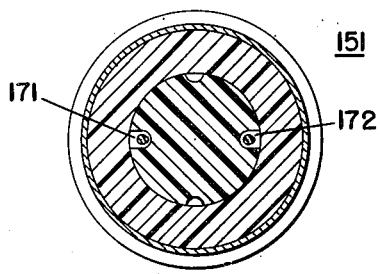

Referring to FIGS. 10, 10A and 10B, there is illustrated a further modification of the invention, somewhat similar to that shown in FIG. 9. In FIG. 10, there is shown an assembly 150 in which the expendable primary element 151 has been inserted in the immersion end of a cardboard tube, 152, the opposite end of which is adapted to receive a manipulator 153. The manipulator 153 has been illustrated as comprising a plurality of pipe sections including two closely spaced pipe couplings 154 and 155. The cardboard tube 152 is provided with a cutout or slot which is adapted to be aligned with the space between the couplings 154 and 155 and wrapped with wire 156 to secure the tube 152 to the manipulator 153. The wire wrap preferably is covered with a high temperature cement and/or a cardboard sleeve 157. The lower end of the manipulator 153 is provided with a sleeve or coupling 159 which serves as a spacer for the cardboard tube 152. The expendable primary element 151 is connected to the compensating lead wires 118c and 117c by any suitable means, crimp connectors 160, 161, being illustrated. The opposite ends of the lead wires 118c and 117c are provided with a polarized plug-in connector 164 which may be of any suitable type and is adapted to connect to a mating connector 165 leading to the measuring circuit.

The expendable primary element 151 has been illustrated in more detail in FIGS. 10A and 10B. It includes the thermocouple assembly 119, previously described, supported in a grooved cylindrical block or plug 170. The block 170 may be made from any suitable insulating material, such as Bakelite, ceramic, hard paper, or other products. The block 170 is provided with a pair of grooves 171 and 172 which are adapted to receive the ends of the thermocouple assembly 119 and the compensating lead wire members 118c' and 117c'. The compensating lead wire members 118c' and 117c' are relatively long with respect to the short lengths of the thermocouple material 120 and 121 and are adapted to be connected to the extension lead wires 118c and 117c by the connectors 160 and 161 shown in FIG. 10. A paper sleeve 175 surrounds the block member 170 and cooperates with the grooves 171 and 172 to form enclosed passages. The extension wires 117c' and 118c' are adapted to be sealed to the upper end of the block 170 and the cardboard sleeve 175 by suitable cement 176. The thermocouple assembly 119 likewise is adapted to be secured to the lower end of the plug 170 and the cardboard tube 175 by suitable high temperature cement 177. The protective cap 178, in the form a metal can, has been slipped over the end of the expendable primary element 151 and secured to the paper tube 175 as by crimping at 178a. It will be understood that the expendable primary elements shown in FIGS. 9 and 10 may be provided with other types of contact structures such, for example, as shown in FIGS. 4 and 5.

From the foregoing it will be seen that the expendable immersion thermocouple units may be constructed in various forms and each will have certain advantages.

For example, the plug-in units of relatively short length may be preferred where shipping costs are relatively high since cardboard tubes for protecting the manipulator can be purchased locally. Where shipping costs are not a major factor, some of the longer modifications may be preferred. By supporting the thermocouple assembly directly in the end of a cardboard tube, or wood body, the thermocouple assembly may be supplied preassembled and be completely expendable. Likewise, by supporting the thermocouple assembly directly in the end of a wood member or cardboard tube of adequate length, there is eliminated all danger of leakage of molten material into the plug-in connecting structure. The cardboard tube units per se have a particular advantage in that the material is very low in cost, easy to obtain, and lends itself to low cost production techniques.

The subject matter of the embodiments shown in FIGS. 7–10B inclusive is claimed herein and claims generic to all the figures herein and specific to FIGS. 1–6 appear in my aforesaid copending application Serial No. 736,947, now Patent No. 2,999,121.

It shall be understood the invention is not limited to the specific arrangements shown, and that changes and modifications may be made within the scope of the appended claims.

What is claimed is:

1. An article of manufacture for use in the immersion measurement of high temperatures comprising an expendable unitary thermocouple device having as components thereof a first tubular member of cardboard an end of which is immersible, a rigid body structure having heat-insulating properties, said body structure being directly supported in said immersible end of said first tubular member, thermocouple elements having portions which extend into said body structure to be supported thereby and portions which extend outwardly therefrom into electrical connection one with the other to form a measuring junction, electrical conductors disposed within said first tubular member electrically connected to said thermocouple elements at points to be immersed and extending toward the end opposite said immersible end of said first tubular member for connection to a measuring system, and a second tubular member of cardboard, said first tubular member being disposed in one end of said second tubular member, said second tubular member extending beyond said first tubular member in the direction of said end of said first tubular member opposite said immersible end.

2. An assembly for measuring the temperature at a sub-surface level of a molten bath such as a bath of molten steel comprising a completely expendable assembly including a support, a refractory protected temperature-responsive element mounted in said support, electrically conductive means several feet long connected to said temperature-responsive element for connecting said element in a measuring circuit, and tubular cardboard structure several feet in length carrying said support with said temperature-responsive element mounted at an immersion end of said cardboard structure and said conductive means extending through the length of said cardboard structure, the end of said cardboard structure opposite its immersion end constituting a handle by means of which said temperature-responsive element is thrust to said sub-surface level of the molten bath.

3. A device for immersion pyrometry of temperatures in a range above 1000° F. comprising an unsupported length of cardboard tube, a temperature-responsive element encased in heat-transmitting refractory supported in heat-receiving relation at an immersion end of said cardboard tube, and electrically conductive members connected to said temperature-responsive element and extending within said tube towards the other end thereof through said unsupported length for connecting said temperature-responsive element to a measuring circuit.

4. An immersion thermocouple comprising a first expendable light-weight cardboard tube, a second expendable light-weight cardboard tube, the outer diameter of said second tube being substantially equal to the inner diameter of said first tube so that said first tube fits over said second tube, an end wall extending across one end of said second tube, a ceramic tube extending into said end wall, dissimilar metals joined together in said ceramic tube, and a separate wire connected to each of said dissimilar metals, said wire extending through said second tube towards the other end of said second tube.

5. An immersion temperature-sensing assembly comprising a first tube of heat-insulating material, a second tube of heat-insulating material, the outer diameter of said second tube being substantially equal to the inner diameter of said first tube so that said first tube fits over said second tube effecting extension of the length of said second tube, an end wall extending across one end of said second tube, and a refractory protected temperature-sensing means projecting outwardly of said end wall with electrically conductive portions extending through said end wall and beyond the opposite end of said second tube for connection within said first tube to the lead-wires of a measuring circuit.

6. An immersion temperature-sensing assembly according to claim 5 wherein said temperature-sensing means comprises a thermocouple, the projecting portion of which is encased in electrically-insulating heat-conducting refractory material and wherein said electrically conductive portions comprise lead-wires attached to said thermocouple in a heat-insulated region established by said end wall and said second tube.

7. An immersion thermocouple assembly comprising a cardboard tube, an end wall extending across one end of said tube, a thermocouple supported from said end wall and having a portion encased in electrically insulating heat-transmitting refractory projecting outwardly from said end wall, and lead-wires connected to said thermocouple within a heat-insulated region provided by said end wall and said cardboard tube, said leadwires extending through said tube to the other end thereof for connecting said thermocouple to a measuring circuit, said cardboard tube constituting the means for immersing said thermocouple.

8. An immersion thermocouple assembly comprising cardboard tube structure having at its immersion end an end wall, a refractory-insulated thermocouple supported to project from said immersion end wall of said cardboard tube structure, first leadwire structures connected to said thermocouple adjacent said immersion end of said cardboard tube structure and extending towards the end of said tube opposite from its immersion end, a manipulator extending into said opposite end of said cardboard tube structure and terminating a substantial distance from said end wall, and second leadwire structures extending the length of said manipulator, said second leadwire structures being connected to said first leadwire structures at a location within said cardboard tube structure.

9. An immersion temperature-sensing assembly comprising a first tube of heat-insulating material having an immersion end, a refractory encased temperature-sensing means carried by said immersion end of said first tube and projecting outwardly therefrom, leadwire structure connected to said temperature-sensing means at said immersion end and extending towards the opposite end of said first tube, wire structure having portions interiorly and exteriorly disposed on said first tube at an end region of the tube opposite said immersion end for relating the position of said first tube to a manipulator, and a second tube of heat-insulating material having an internal diameter substantially equal to the exterior diameter of said first tube disposed about said first tube in protective covering relation with respect to said wire structure.

10. An expendable immersion temperature-sensing device comprising a cardboard tube having an unsupported immersion end portion, a closure for said unsupported end portion, a primary element having a heat-receiving portion of refractory material projecting from the outer face of said closure, and expendable electrically conductive structure connected to said primary element within said immersion end portion to form junctions close to but interiorly of said outer face of said closure, the length of said expendable conductive structure connected to said primary element and constituting a part of said expendable immersion temperature-sensing device being sufficient to extend substantially entirely through said unsupported immersion end portion of said cardboard tube.

11. An assembly for immersion pyrometry comprising a manipulator and an expandable temperature-sensing device including cardboard tube structure, said manipulator including electrically conductive structure passing therethrough for connection to said temperature-sensing device and having registration means to locate an open end of said cardboard tube structure of said temperature-sensing device with respect to the lower end of said manipulator, said expendable temperature-sensing device including said cardboard tube structure having an immersion end, temperature-sensing means supported within said immersion end, and electrical conductors attached to said temperature-sensing means at points forming junctions in said immersion end and extending toward said open end, said electrical conductors being electrically connected to said electrically conductive structure of said manipulator within said cardboard tube structure and said registration means being located to position said cardboard tube structure relative to said manipulator so as to provide an unsupported length of cardboard tube between said temperature-sensing means and the lower end of said manipulator.

12. An immersion thermocouple assembly comprising a cardboard tube, a first block forming a wall extending across one end of said tube, a thermocouple supported by said end wall and having a portion encased in heat transmitting refractory projecting outwardly from said end wall, a second block supported by said cardboard tube between the ends thereof, and plug-in electric contact structures mounted on said second block, said contact structures being electrically connected to said thermocouple within a heat-insulated region provided by said end wall and said cardboard tube at locations near said end wall.

13. An immersion thermocouple assembly in accordance with claim 12 wherein a second cardboard tube having an inside diameter substantially equal to the outside diameter of the first-named cardboard tube supports the latter in one end thereof thus effecting extension of the length of the first-named cardboard tube.

References Cited in the file of this patent

UNITED STATES PATENTS

| | | |
|---|---|---|
| 2,071,531 | Hulme | June 29, 1932 |
| 2,463,427 | Richards | Mar. 1, 1949 |
| 2,649,489 | Turkington | Aug. 18, 1953 |
| 2,785,216 | Winner | Mar. 12, 1957 |

FOREIGN PATENTS

| | | |
|---|---|---|
| 706,643 | Great Britain | Mar. 31, 1954 |
| 72,858 | Germany | Feb. 19, 1893 |